United States Patent [19]

Vargiu et al.

[11] 4,118,555
[45] Oct. 3, 1978

[54] PROCESS FOR THE PREPARATION OF PETROLEUM RESINS

[75] Inventors: Silvio Vargiu, Casatenovo (Como); Edoardo Carpaneti, Sovico (Milan); Giancarlo Crespolini, Vedano Al Lambro (Milan); Mario Pitzalis, Arcore (Milan), all of Italy

[73] Assignee: Euteco, S.p.A., Milan, Italy

[21] Appl. No.: 822,172

[22] Filed: Aug. 5, 1977

[30] Foreign Application Priority Data

Aug. 5, 1976 [IT]  Italy .............................. 26047 A/76

[51] Int. Cl.$^2$ ........................................... C08F 240/00
[52] U.S. Cl. ........................................... 526/76; 260/5; 260/888; 260/889; 260/894; 526/290
[58] Field of Search .................................. 526/76, 290

[56] References Cited

U.S. PATENT DOCUMENTS

| | | | |
|---|---|---|---|
| 2,764,577 | 9/1956 | Hubbard et al. | 526/76 |
| 2,779,750 | 1/1957 | Fuqua et al. | 526/76 |
| 3,905,948 | 9/1975 | Varqiu et al. | 526/290 |

Primary Examiner—Harry Wong, Jr.
Attorney, Agent, or Firm—Sughrue, Rothwell, Mion, Zinn and Macpeak

[57] ABSTRACT

Petroleum resins are prepared by subjecting to pre-polymerization a hydrocarbon fraction containing olefins and diolefins, having a boiling range of from 30° to 300° C, in the presence of activated clays, recovering from the pre-polymerization products a selected hydrocarbon fraction having a boiling point not exceeding 250° C, mixing this selected fraction with a hydrocarbon fraction containing unsaturated hydrocarbons with an average of 5 carbon atoms per molecule, subjecting the resulting mixture to polymerization in the presence of a Friedel-Crafts catalyst and recovering the petroleum resins from the polymerization products. These petroleum resins form homogeneous mixtures with rubber.

13 Claims, No Drawings

PROCESS FOR THE PREPARATION OF PETROLEUM RESINS

The present invention relates to the preparation of petroleum resins compatible with n-hexane and having high colour characteristics.

As is known, the petroleum resins (or resins from petroleum or hydrocarbons) are produced from certain hydrocarbon fractions, resulting from the refining of petroleum, which contain olefins and diolefins. In particular, these hydrocarbon fractions are subjected to polymerization using Friedel-Crafts catalysts. The hydrocarbon fractions resulting from pyrolysis in the presence of water vapour (steam-cracking) are particularly useful for the purpose. Thus, for example, relatively heavy petroleum fractions, such as naphthas or kerosenes, are subjected to pyrolysis at relatively low pressures and at temperatures of the order of 550°–850° C. in the presence of steam. By keeping the contact times relatively short, products are obtained, amongst others, which boil within a temperature range of 30° to 300° C., and which are rich in olefins, diolefins and aromatic compounds, and poor in paraffins.

The characteristics of the petroleum resins depend essentially on the particular hydrocarbon mixture chosen, as well as on the conditions in which the polymerization is carried out.

Thus, for instance, by polymerizing hydrocarbon fractions with a wide boiling range with Friedel-Crafts catalysts one obtains petroleum resins with poor colour characteristics, little compatibility with n-hexane and having an excessively high degree of unsaturation. In order to improve the characteristics of the petroleum resins, recourse has been made to selected hydrocarbon fractions, having a relatively restricted boiling range, obtained by subjecting the wide boiling range fractions to treatments such as solvent extraction or fractional distillation.

Such methods have not, however, afforded satisfactory separation of those fractions which, when subjected to polymerization, produce petroleum resins possessing all the desirable characteristics. Most probably, neither distillation nor solvent extraction ensure a satisfactory removal of the undesirable constituents, for example, those which give rise to coloration.

On the other hand, treatment of the petroleum resins by hydrogenation in order to improve the colour is complex and expensive and does not always produce satisfactory results.

A further undesirable characteristic of petroleum resins is their low strength. Therefore, they are normally used in combination with rubbers or plastics materials.

Thus, for example, hydrocarbon resin-rubber combinations find considerable use in the coating and adhesive fields, especially for heat sealing. The rubbers may be natural (pale crepe type) or synthetic, such as butadiene-styrene, acrylonitrile-butadiene, polyisoprene, neoprene or butyl rubbers.

In such applications drawbacks are often encountered due essentially to the poor compatibility of rubber particularly with those petroleum resins which are produced from unsaturated hydrocarbon cuts whose boiling point is higher than about 130° C.

These petroleum resins have in fact a poor compatibility with hexane and, as is known, this characteristic is directly related to the compatibility of the said resins with natural or synthetic rubbers.

A notable improvement relating to the colour of the petroleum resins can be achieved by operating in accordance with Italian Pat. No. 975795, according to which a hydrocarbon fraction containing olefins and diolefins is first subjected to a pre-polymerization with separation of those components which give rise to the colour.

The non-polymerized part is then distilled, with separation of a "selected hydrocarbon fraction" and the latter is subjected to polymerization with Friedel-Crafts catalysts to give petroleum resins having good colour characteristics.

According to the present invention the colour of the petroleum resins is further improved and characteristics of high solubility in n-hexane are given to the latter, when the "selected hydrocarbon fraction", previously defined, has a boiling range the maximum value of which is not higher than 250° C. and the said "selected hydrocarbon fraction" is subjected to polymerization with Friedel-Crafts catalysts together with a hydrocarbon fraction containing unsaturated hydrocarbons with 5 atoms of carbon per molecule, or a mixture of unsaturated hydrocarbons having an average of 5 carbon atoms per molecule.

Thus, the invention provides a process for the preparation of petroleum resins, which comprises (a) subjecting a hydrocarbon fraction containing olefins and diolefins, having a boiling range of from 30° to 300° C., to prepolymerization in the presence of activated clays, thereby to transform a portion of said fraction not exceeding 20% by weight into pre-polymers having a boiling point above 250° C.;

(b) removing said activated clays from the prepolymerization medium;

(c) subjecting the resulting hydrocarbon solution of pre-polymers to distillation in such a way as to recover as distillate a selected hydrocarbon fraction having a maximum boiling point of 250° C.;

(d) adding to the said selected hydrocarbon fraction from 0.05 to 1 part by weight of a $C_5$ hydrocarbon fraction for each part by weight of said selected hydrocarbon fraction, said $C_5$ hydrocarbon fraction containing unsaturated hydrocarbons with five carbon atoms or a mixture of unsaturated hydrocarbons with an average of five carbon atoms per molecule, and having a boiling range of from 25° to 130° C., and subjecting the resulting hydrocarbon mixture to polymerization in the presence of a Friedel-Crafts catalyst with conversion into polymer of a quantity not exceeding 50% by weight with respect to said mixture; and (e) recovering the petroleum resin from the resulting polymerization products.

Stage (a)

In the preferred embodiment of the present invention hydrocarbon fractions boiling within a temperature range of 120° to 260° C. are subjected to pre-polymerization.

These fractions, rich in olefins and diolefins and poor in paraffins, generally have a bromine value greater than about 70.

In the pre-polymerization stage the hydrocarbon fraction is generally brought into contact with a quantity of 2 to 10 parts by weight of activated clays for every 100 parts by weight of the fraction itself and polymerization is generally carried out at a temperature of from 10° to 60° C., for a period of from 1 to 60 minutes.

Preferably, a quantity of from 1 to 10% by weight of the hydrocarbon fraction is transformed into pre-polymers and pre-polymerization is carried out at a temperature of from 25° to 35° C. and for a period of from 20 to 40 minutes.

Activated clays are products well known in the art and are described, for example, in Kirk-Othmer, "Encyclopedia of Chemical Technology" (1949) Vol.4, page 53 et seq.

Stage (b)

The activated clays are separated from the prepolymerization products, for example by centrifuging or filtration, and thus a hydrocarbon solution of the prepolymers is recovered.

Stage (c)

The solution resulting from the preceding stage is subjected to distillation in such a way as to separate a selected hydrocarbon fraction having a maximum boiling point of 250° C. and preferably of 240° C. This selected hydrocarbon fraction typically has a minimum boiling point of 140°–150° C., contains a considerable amount of unsaturated aliphatic hydrocarbons with from 9 to 11 carbon atoms and typically has a bromine value of the order of 70–80.

Stage (d)

The selected hydrocarbon fraction from the preceding stage is mixed with a $C_5$ hydrocarbon fraction containing unsaturated hydrocarbons with 5 carbon atoms or a mixture of unsaturated hydrocarbons having on average 5 atoms of carbon per molecule. Particularly useful for this purpose are the products obtained by steam cracking of petroleum fractions, which boil at a temperature of from 25° to 130° C. and which have a bromine value of 90 to 130.

Preferably, the resulting hydrocarbon mixture contains from 0.15 to 0.65 parts by weight of the said $C_5$ fraction for every part by weight of the selected hydrocarbon fraction.

The said hydrocarbon mixture is polymerized in the presence of a Friedel-Crafts catalyst, said catalyst being generally used in an amount of from 0.1 to 1.0 part by weight for every 100 parts by weight of the hydrocarbon mixture and being preferably chosen from aluminium chloride, aluminium bromide and boron trifluoride, which may be added to the reaction medium in solid form, in the form of a solution or in the form of a hydrocarbon complex.

The polymerization temperature is generally from $-100$ to $+100°$ C., and preferably from 25° to 75° C. The polymerization is generally carried out for a period of from 20 to 90 minutes.

Preferably, an amount of from 15 to 50 wt.% of the hydrocarbon mixture is converted into polymer.

Stage (e)

The reaction products of stage (d) are treated according to conventional methods for removing the catalyst and the low-boiling products.

According to a preferred embodiment, the residual solution obtained upon removal of the catalyst is treated with activated clays to improve the colour of the resin. This treatment may be carried out according to the methods shown in the aforesaid Italian Patent.

After separation of the activated clays the low-boiling products are distilled off and a petroleum resin of extremely low colour and with high characteristics of compatibility with n-hexane is recovered as a distillation residue.

These properties of the petroleum resin are important for the use of the resin in the rubber, paints, inks and adhesives fields.

In particular, in view of their high compatibility with n-hexane the petroleum resins of the present invention can easily be mixed with rubber and the resulting mixtures are homogeneous.

Furthermore, in the paints, inks and adhesives fields it is possible to use aliphatic solvents instead of aromatic ones which are far more toxic.

The invention is further illustrated by the following non-limiting Examples, in which the parts and percentages are by weight unless otherwise specified.

EXAMPLE 1 (comparative)

There are loaded into a reactor provided with a stirrer and a reflux condenser, 1000 parts of an unsaturated hydrocarbon fraction resulting from steam-cracking, having the following characteristics:
Distillation range: 155°–252° C. (ASTM D 86-56)
Bromine value: 71 (ASTM 1158-59T)
Density at 15° C.: 0.962 g/ml.

The mass is agitated and heated to 50° C. Then 11 parts of a catalyst consisting of a 45% solution of $AlCl_3$ in ethylbenzene are added over 20 minutes.

After the addition of the catalyst agitation is maintained for 30 minutes at the said temperature, then the mass is cooled and 150 parts of a 5% aqueous sodium hydroxide solution are added to the mass.

Agitation is stopped, the aqueous phase is separated from the organic one and the latter is treated under agitation for 10 minutes at 40° C. with activated clay added in an amount of 3 wt.% with respect to the organic phase. The activated clay used is that known by the trade name Rumsil.

The activated clay is filtered off and the resulting limpid solution, which contains 40% of polymer, is subjected to evaporation at 60–80 mmHg and at a temperature of 230° C.

The characteristics of the hydrocarbon resin thus obtained are recorded in the Table, together with the percentage conversion of the hydrocarbon fraction subjected to polymerization.

EXAMPLE 2 (comparative)

The unsaturated hydrocarbon fraction of Example 1 is mixed with a $C_5$ hydrocarbon fraction in a 90:10 ratio.

The $C_5$ fraction resulting from steam-cracking has the following characteristics:
Distillation range: 30°–105° C. (ASTM D 86 - 56)
Bromine value: 114 (ASTM 1158-59T)

Operation is carried out as in Example 1. The characteristics of the petroleum resin thus obtained are recorded in the Table.

EXAMPLES 3–5 (comparative)

Operation is carried out as in Example 1, starting from a mixture of the hydrocarbon fraction of Example 1 with the $C_5$ hydrocarbon fraction of Example 2 in a ratio of 85:15, 70:30 and 50:50, respectively.

The results are shown in the Table.

EXAMPLE 6

To 1000 parts of the hydrocarbon fraction of Example 1 are added 50 parts of Rumsil activated clay.

The mass is agitated at 32° C. for 50 minutes.

The activated clay is then filtered off and a hydrocarbon solution comprising 10% of pre-polymers is obtained.

The said solution is subjected to distillation at 60 mmHg and at 170° C. until a solution containing about 50% of polymer is obtained as a distillation residue.

The distillate thus obtained has the following characteristics:
Boiling range: 150°–240° C. (ASTM D 86-56
Bromine value: 74 (ASTM 1158-59T)
Density at 15° C.: 0.941 g/ml.

This distillate constitutes the selected hydrocarbon fraction which is used in the following examples for the polymerization with Friedel-Crafts catalysts.

EXAMPLE 7 (comparative)

The selected hydrocarbon fraction of Example 6 is subjected to polymerization by operating as in Example 1.

In this run the selected fraction is not mixed with the $C_5$ fraction.

The results are summarized in the Table.

EXAMPLES 8–11

The selected fraction of Example 6 is mixed with the $C_5$ fraction of Example 2 in a ratio of 90:10, 85:15, 70:30 and 50:50, respectively. The hydrocarbon mixtures thus obtained are converted into hydrocarbon resins according to the procedure shown in Example 1.

The results are summarized in the Table.

TABLE

| Example | 1 | 2 | 3 | 4 | 5 | 7 | 8 | 9 | 10 | 11 |
|---|---|---|---|---|---|---|---|---|---|---|
| Conversion (%) | 46 | 41 | 34 | 41 | 20 | 41 | 39 | 40 | 39 | 17 |
| Non-volatile substances (%) | 98 | 99 | 98.5 | 99 | 98.5 | 99.5 | 99.3 | 98 | 98 | 99 |
| Melting range (° C) | 89–93 | 88–92 | 88–92 | 86–89 | 85–88 | 101–105 | 91–95 | 85–88 | 80–83 | 74–76 |
| Gardner viscosity (at 25° C in a 70% toluene solution) | U | U | U+½ | U | T+½ | X+½ | U | U | T+½ | T |
| Gardner colour (50% in toluene) | 18 | 18 | 16 | 15 | 16 | 14 | 14 | 11 | 9 | 8 |
| Solubility in n-hexane | 1:0.5 | 1:1 | 1:1 | 1:2 | 1:4 | 1:0.7 | 1:13 | 1:∞ | 1:∞ | 1:∞ |
| Bromine value | 22 | 24 | 21 | 25 | 30 | 18 | 16 | 20 | 24 | 28 |

What we claim is:

1. A process for the preparation of petroleum resins of good solubility in n-hexane, which comprises:
  (a) subjecting a hydrocarbon fraction containing olefins and diolefins, having a boiling range of from 30° to 300° C., to prepolymerization at a temperature of from 10° to 60° C. for a period of from 1 to 60 minutes in the presence of from 2 to 10 parts by weight of activated clays for each 100 parts by weight of said hydrocarbon fraction, thereby to transform a portion of said fraction of from 1 to 20% by weight into pre-polymers having a boiling point above 250° C.;
  (b) removing said activated clays from the prepolymerization medium;
  (c) subjecting the resulting hydrocarbon solution of prepolymers to distillation in such a way as to recover as distillate a selected hydrocarbon fraction having a maximum boiling point of 250° C.;
  (d) adding to the said selected hydrocarbon fraction from 0.05 to 1 part by weight of a $C_5$ hydrocarbon fraction for each part by weight of said selected hydrocarbon fraction, said $C_5$ hydrocarbon fraction being obtained by steam-cracking of petroleum fractions, having a bromine value of from 90 to 130 and containing unsaturated hydrocarbons with five carbon atoms or a mixture of unsaturated hydrocarbons with an average of five carbon atoms per molecule, and having a boiling range of from 25° to 130° C., and subjecting the resulting mixture to polymerization in the presence of a Friedel-Crafts catalyst with conversion into a petroleum resin of a quantity of from 15 to 50% by weight with respect to said mixture; and
  (e) recovering the petroleum resin of step (d) from the resulting polymerization products.

2. The process of claim 1, in which said hydrocarbon fraction of (a) has a boiling range of from 120° to 260° C.

3. The process of claim 1, in which from 1 to 10% by weight of said hydrocarbon fraction are converted into prepolymers in stage (a).

4. The process of claim 1, in which stage (a) is carried out at a temperature of from 25° to 35° C. and for a period of from 20 to 40 minutes.

5. The process of claim 1, wherein said $C_5$ hydrocarbon fraction is used in an amount of from 0.15 to 0.65 parts by weight for each part by weight of selected hydrocarbon fraction.

6. The process of claim 1, wherein said polymerization is carried out at a temperature of from −100° to 100° C., using from 0.1 to 1 part by weight of Friedel Craft catalyst for each 100 parts by weight of hydrocarbon mixture.

7. The process of claim 1, wherein said polymerization is carried out at a temperature of from 25° to 75° C. and for a period of from 20 to 90 minutes.

8. The process of claim 1, wherein said Friedel-Crafts catalyst is selected from the group consisting of aluminum chloride, aluminum bromide and boron trifluoride.

9. The process of claim 1, wherein said selected hydrocarbon fraction has a minimum boiling point of 140°–150° C. and a maximum boiling point of 240° C.

10. The process of claim 1, wherein said selected hydrocarbon fraction has a bromine value on the order of 70–80.

11. The process of claim 1, wherein said $C_5$ hydrocarbon fraction has a distillation range of 30°–105° C. (ASTM D86-56).

12. The process of claim 11, wherein said distillate of step (c) has a boiling range of 150°–240° C. (ASTM D8656).

13. The process of claim 1, wherein said process is conducted in a non-continuous fashion.